United States Patent [19]

Pillot et al.

[11] Patent Number: 5,028,571

[45] Date of Patent: Jul. 2, 1991

[54] CONVERSION OF POLYCARBOSILANES INTO SILICON NITRIDE CERAMICS

[75] Inventors: Jean-Paul Pillot, Cestas; Jacques Dunoguès, Talence; Marc Birot, Leognan; Raphael Bodet, Pontchateau; Francoise Duboudin, Pessac, all of France

[73] Assignee: Rhone-Poulenc Chimie, Courbevoie, France

[21] Appl. No.: 441,692

[22] Filed: Nov. 27, 1989

[30] Foreign Application Priority Data

Nov. 25, 1988 [FR] France ................... 88 15392

[51] Int. Cl.$^5$ .............................................. C04B 35/58
[52] U.S. Cl. ............................................ 501/97; 501/96
[58] Field of Search ............... 501/96, 97, 98; 528/10, 528/31; 525/474; 556/530

[56] References Cited

U.S. PATENT DOCUMENTS

| | | | |
|---|---|---|---|
| 4,650,773 | 3/1987 | Okamura et al. | 501/95 |
| 4,743,662 | 5/1988 | Lipowitz | 501/88 |
| 4,761,389 | 8/1988 | Rabe et al. | 501/95 |

FOREIGN PATENT DOCUMENTS

| | | |
|---|---|---|
| 0051855 | 5/1982 | European Pat. Off. . |
| 0200326 | 12/1986 | European Pat. Off. . |
| 0208630 | 1/1987 | European Pat. Off. . |
| 0259944 | 3/1988 | European Pat. Off. . |
| 0266860 | 5/1988 | European Pat. Off. . |
| 0280387 | 8/1988 | European Pat. Off. . |

OTHER PUBLICATIONS

Composites, vol. 18, No. 2, Apr. 1987, pp. 107–120, Butterworth & Co. Ltd., Guildford, Surrey, GB, K. Okamura, "Ceramic Fibres from Polymer Precursors".

*Primary Examiner*—William R. Dixon, Jr.
*Assistant Examiner*—Anthony J. Green
*Attorney, Agent, or Firm*—Burns, Doane, Swecker & Mathis

[57] ABSTRACT

Silicon nitride ceramic materials are produced by (a) hardening a fusible polycarbosilane containing at least two ≡SiH groups per molecule by intimately contacting such fusible polycarbosilane with an effective hardening amount of the vapors of sulfur, and then (b) pyrolyzing the infusible polycarbosilane which results under an ammonia atmosphere.

13 Claims, No Drawings

CONVERSION OF POLYCARBOSILANES INTO SILICON NITRIDE CERAMICS

CROSS REFERENCE TO COMPANION APPLICATIONS

Copending applications Ser. No. 07/441,691, Ser. No. 07/442,647, and Ser. No. 07/441,693, each filed concurrently herewith and each assigned to the assignee hereof.

BACKGROUND OF THE INVENTION

1. Field of the Invention

The present invention relates to the production of ceramic articles based on silicon nitride and, more especially, to the production of such ceramics from organosilicon compounds of the polycarbosilane type.

2. Description of the Prior Art

The production of ceramic articles by thermal degradation of organosilicon polymers in a controlled atmosphere is known to this art; numerous literature articles and patents exist on the subject.

One advantage of this "polymer" technique resides, in particular, in the possibilities for shaping this type of product, notably into ceramic fibers, after pyrolysis thereof.

According to the conventional technique, the polymer precursors of polycarbosilane type (possibly after the melting thereof, if originally they are in the solid state) are extruded in the form of continuous fibers (or filaments), which subsequently are treated, in particular to improve their high temperature and/or mechanical strength, and then pyrolyzed in a suitable atmosphere to produce the desired ceramic fiber.

The pretreatment of the fibers prior to pyrolysis, typically designated a hardening, infusibility or crosslinking treatment, is an essential stage in any process for the preparation of ceramic fibers.

At the present time, the hardening of polycarbosilane fibers entails either physical techniques (electronic, UV-irradiation, etc.) or chemical techniques.

The aforementioned physical techniques have the major disadvantage of being awkward and expensive. Therefore, the only economical technique utilized on an industrial scale is chemical hardening by means of an oxygen treatment.

It too is known to this art:

(a) that the pyrolysis of a polycarbosilane pretreated physically or with oxygen, under an inert atmosphere or in vacuum, provides a ceramic material based on silicon carbide;

(b) that the pyrolysis under ammonia of a polycarbosilane pretreated with oxygen in all cases provides ceramic articles containing silicon oxynitride values (as a result of the introduction of oxygen during the pretreatment); and, finally, (c) that the pyrolysis under ammonia of a physically pretreated polycarbosilane provides, depending upon the temperature used, either silicon carbonitride or silicon nitride (partial or total substitution of carbon atoms by nitrogen atoms).

Therefore, serious need continues to exist in this art for a process for the preparation of silicon nitride from polycarbosilanes which avoids the disadvantages resulting from the necessary utilization of the aforementioned physical pretreatments.

SUMMARY OF THE INVENTION

Accordingly, a major object of the present invention is the provision of a simple, effective, economical and easily carried out technique for the production of ceramic articles based on silicon nitride in a very wide variety of forms (filaments, fibers, molded articles, coatings, films, and the like), which technique conspicuously avoids those disadvantages and drawbacks to date characterizing the state of this art.

Briefly, the present invention features an improved process for the preparation of ceramic materials based on silicon nitride by the pretreatment and pyrolysis of at least one polycarbosilane under an ammonia atmosphere, and wherein such polycarbosilane has at least two $\equiv$SiH groups per molecule, said pretreatment comprising intimately contacting the polycarbosilane with sulfur in the vapor state.

DETAILED DESCRIPTION OF THE PREFERRED EMBODIMENTS OF THE INVENTION

More particularly according to the present invention, the polycarbosilane starting materials are polymers well known to this art; these polymers may be prepared from a very wide variety of beginning intermediates utilizing a wide variety of different techniques.

It will of course be appreciated that polycarbosilanes are organosilicon compounds having carbon atoms and silicon atoms as the principal components of their molecular skeletons and which may have structures of the linear, cyclic or mixed type, i.e., structures in which linear carbosilane recurring units and cyclic carbosilane recurring units are bonded chemically.

According to the present invention, such polycarbosilanes must contain at least two and preferably at least three $\equiv$SiH groups per molecule.

The synthesis of such polycarbosilanes may be carried out by the techniques described, in particular, in FR 2,308,590, FR 2,308,650, FR 2,327,836, FR 2,345,477, FR 2,487,364 and EP 51,855, all of which are hereby expressly incorporated by reference.

Prior to the hardening treatment according to the invention (more fully described below), the polycarbosilanes are formed by any one of a number of shaping operations to impart various configurations thereto, such as filaments, fibers, molded articles, support coatings and the like. The treatment according to the invention is thus advantageously used for the hardening of polycarbosilane fibers which, after treatment, are then pyrolyzed in ammonia to produce ceramic fibers based on silicon nitride.

According to the invention and after optional forming, the polycarbosilanes described above are then treated with sulfur vapors.

The sulfur vapors may be used in the pure state, or they may be diluted in an inert gas, such as argon (or any other rare gas) or nitrogen, for example.

The polycarbosilanes and the vapors may be intimately contacted with each other in a static or a dynamic state, i.e., in a flowstream of vapors.

The vapors may be generated by any known means, in particular by the vaporization of sulfur, or by the decomposition of any compound capable of generating sulfur under the practical conditions of the treatment according to the invention.

The temperature at which the treatment is carried out may vary widely and depends on the nature of the polycarbosilane to be hardened.

In practice, this temperature generally ranges from 150° C. to the softening temperature of the polymer; it is even possible to conduct the operation at temperatures higher than the softening point in light of the quasi-instantaneous nature of the polycarbosilane hardening treatment in the presence of sulfur vapors. Nevertheless, and preferably, the temperature of the treatment advantageously ranges from 200° C. to a temperature slightly less than that corresponding to the softening point of the polycarbosilane to be hardened.

The duration of the treatment according to the invention is not critical and may vary from a few seconds to several days and preferably from a few minutes to several hours.

In general, this duration depends on the temperature of the treatment; the higher the temperature, the shorter the duration may be.

Upon completion of the treatment according to the invention, a polycarbosilane that is perfectly infusible and insoluble in most organic solvents, in particular in hexane, is obtained.

Depending on the amount of the sulfur used, the duration and the temperature of the treatment, together with the nature of the initial polycarbosilane, the treated product may contain quantities of sulfur generally ranging from 3% to 30% by weight relative to the total weight of the product, and preferably ranging from 10% to 20% by weight.

Without wishing to be bound to any particular theory, the gradual disappearance of the $\equiv$SiH bands observable by infra-red analysis of the polymer over the course of the treatment would appear to indicate that the hardening according to the invention may take place by the creation of bonds of the $\equiv$Si—S—Si$\equiv$ type within said polymer.

The sulfur incorporated in this manner may be gradually eliminated during a subsequent heat treatment (pyrolysis) carried out to convert the hardened polycarbosilane into a ceramic, as more fully described below.

The pyrolysis is carried out in an ammonia atmosphere, which may be static or dynamic.

The temperature and the duration of the treatment must be such that substantially all of the sulfur and all of the carbon initially present in the polycarbosilane are eliminated by their replacement by nitrogen, i.e., until the polycarbosilane is ultimately completely converted into a ceramic based on silicon nitride.

Generally, pyrolysis temperatures ranging from 900° to about 1,500° C. are sufficient to attain the desired result.

Also without wishing to be bound by any particular theory, the substitution mechanisms are considered to be the following:

(a) initially, at relatively low treatment temperatures, i.e., not exceeding 500° C., the nitrogen is introduced by the replacement and elimination of the sulfur contained in the hardened polycarbosilane. Overall, the molar amount of nitrogen that may be introduced into the polycarbosilane essentially corresponds to the molar amount of sulfur initially present. Upon completion of this first stage of the treatment, the residual sulfur contents are very low;

(b) secondly, and if the temperatures are higher, i.e., temperatures ranging from about 500° to 1,500° C. are used, the additional amounts of nitrogen are introduced, but in this instance by the replacement of the carbon by nitrogen, until all of the carbon is eliminated and the silicon nitride is ultimately produced.

As indicated above, the process according to the invention is particularly suitable for the production of ceramic fibers based on silicon nitride. These are useful, for example, for the reinforcement of composite materials comprising a glass, plastic, metal, ceramic or other matrix.

In order to further illustrate the present invention and the advantages thereof, the following specific examples are given, it being understood that same are intended only as illustrative and in nowise limitative.

In said examples to follow, the production of ceramic fibers based on silicon nitride was featured.

EXAMPLES

Preparation of Polycarbosilane Fibers

The polycarbosilane used was synthesized by heating a polydimethylsilane at 470° C. in an autoclave, according to the technique described by S. Yajima et al, *J. Mater. Sci.*, (13), 2569 (1978) and FR 2,308,650.

The selective elimination of high molecular weight polymers contained in the polycarbosilane specimens prepared in this manner (optional, but preferred stage in the extrusion of the fibers) may be carried out, in particular, by the selective dissolution of the polymers of moderate to high molecular weights in ethyl acetate (at a temperature of from 30° to 50° C.), then recovering the polycarbosilane fraction thus dissolved. See copending application Ser. No. 07/441,691, filed concurrently herewith.

Commercial polycarbosilanes, such as those marketed by NIPPON CARBON Co., are also suitable starting materials.

The polycarbosilanes obtained in this manner were then extruded and drawn in the form of fibers having an average diameter of 15 $\mu$m.

Hardening of the Polycarbosilane Fibers

The apparatus for hardening by sulfur was a tubular enclosure heated by a resistance furnace, into which a slight current of purified argon was introduced (or purified nitrogen). A boat containing solid sulfur, located in the upstream end of the enclosure where the temperature was higher than 140° C., released sulfur in the form of a vapor thereof. The released sulfur was transported by the carrier gas into contact with the polycarbosilane fibers, which had been placed into a second boat located in a downstream end of the enclosure, where the prevailing temperature was $\theta_1$.

The rate of the increase in temperature to $\theta_1$ was regulated as follows:

(i) ambient→140° C.: 60°/hour;

(ii) 140° C.→$\theta_1$: 5° C./hour.

The Table summarizes the different hardening experiments (Experiments A1 to A5) for each different $\theta_1$.

The fibers produced upon completion of the treatment were infusible (or nearly infusible in the case of Experiment A2) and insoluble, in particular in hexane.

Infra-red analysis indicated the gradual disappearance of the $\vee$(Si—H) band present in the initial polycarbosilane with increasing sulfur contents.

TABLE

| Experiment | Hardening temperature ($\theta_1$) | Maintenance time (at $\theta_1$) | Weight % of S on treated fibers | Appearance | Remarks |
|---|---|---|---|---|---|
| A1 (Comparative) | — | — | 0 | white | without treatment F |
| A2 | 180° C. | 4 h | 3.5 | straw yellow | I/F |
| A3 | 200° C. | 4 h | 4.5 | ↓ | I |
| A4 | 220° C. | 4 h | 6 | ↓ | I |
| A5 | 240° C. | 4 h | 7 | light brown | I |

Note:
F indicates fusible
I indicates infusible

Pyrolysis Under an Ammonia Atmosphere

The fibers obtained after treatment according to Experiment A4 were placed in a tubular furnace swept by a flowstream of purified ammonia.

The furnace was then heated gradually to a temperature of 950° C. (rate of temperature increase: 2° C./min).

When the temperature reached 950° C., the flowstream of ammonia and the temperature of 950° C. were maintained for 2 hours.

The fibers then had an ochre color. Microprobe analysis indicated a sulfur content of 0 and a carbon content of less than 1% by weight. These fibers were a ceramic based on silicon nitride.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a silicon nitride ceramic material, comprising (a) hardening a fusible polycarbosilane containing at least two $\equiv$SiH groups per molecule by intimately contacting same with an effective hardening amount of gaseous elemental sulfur, thereby making the polycarbosilane infusible, and thence (b) pyrolyzing the infusible polycarbosilane which results under an ammonia atmosphere.

2. A process as defined by claim 1, wherein said fusible polycarbosilane contains at least three $\equiv$SiH groups per molecule.

3. The process as defined by claim 1, said step (a) being carried out at a temperature ranging from 150° C. to the softening point of said fusible polycarbosilane.

4. The process as defined by claim 3, said step (a) being carried out at a temperature ranging from 200° C. to slightly less than the softening point of said fusible polycarbosilane.

5. The process as defined by claim 1, said gaseous elemental sulfur being diluted in an inert gas.

6. The process as defined by claim 5, said inert gas comprising argon or nitrogen.

7. The process as defined by claim 1, said step (a) being carried out statically.

8. The process as defined by claim 1, said step (a) being carried out dynamically.

9. The process as defined by claim 1, including the step of shaping said fusible polycarbosilane, thereby forming a shaped article.

10. The process as defined by claim 9, said shaped article comprising a fiber or filament.

11. The process as defined by claim 1, said step (b) being carried out at a temperature ranging from 900° to 1,500° C.

12. The process as defined by claim 1, said step (b) being carried out statically.

13. The process as defined by claim 1, said step (b) being carried out dynamically.

* * * * *